Patented Mar. 19, 1929.

1,706,101

UNITED STATES PATENT OFFICE.

HENRY BLUMENBERG, JR., OF LOS ANGELES, CALIFORNIA, ASSIGNOR TO STOCKHOLDERS SYNDICATE, OF LOS ANGELES, CALIFORNIA, A CORPORATION OF CALIFORNIA.

PROCESS FOR PRODUCTION OF NONHYGROSCOPIC PHOSPHATES AND THE RESULTING PRODUCT.

No Drawing. Application filed April 30, 1925. Serial No. 27,070.

My invention relates to a process of producing slowly soluble non-hygroscopic phosphate fertilizer and the resulting product, and especially non-hygroscopic acid calcium phosphate $CaH_4(PO_4)_2 2H_2O$.

As is well known, acid calcium phosphate is hygroscopic, absorbing moisture from the atmosphere, which renders it difficult of handling in transportation, as well as in agricultural machines when it is used as a fertilizer.

Various methods have been suggested to produce a high grade acid calcium phosphate that will not absorb moisture or become sticky. Among these methods are the addition of calcium hydroxide to the acid calcium phosphate just before sacking the latter; another is to subject the acid calcium phosphate to ammonia gas, but none of these methods have been successful. The free phosphoric acid has a natural tendency to absorb moisture, even in dry climates.

I have discovered that by subjecting the acid calcium phosphate to a fusing temperature its physical properties change and a slowly soluble phosphoric fertilizer is produced, allowing the same to be conveniently handled, both in transportation and in the agricultural machines as a fertilizer.

My invention consists in the steps of the process and the resulting product hereinafter described and claimed.

Acid calcium phosphate, which may contain as high as 40% of available phosphoric acid, may be taken alone or mixed with as much as 20% phosphoric acid, and is subjected to a temperature until fusion takes place. The temperature will depend upon the amount of phosphoric acid present, and may reach 600° C. The fused phosphate thus produced is dark in color and of a glassy and conchoidal nature. It is then ground to about twenty mesh.

The phosphate thus produced is non-hygroscopic, and may therefore be easily handled. It drills readily in machine drills, and is slowly soluble in the ground, therefore preferable to the ordinary phosphate, which yields up its phosphoric acid in a short time. Crude phosphate rock to which say 50 to 60 percent phosphoric acid is added will also give a slowly soluble acid calcium phosphate when heated to fusion.

While I have described my method in connection with acid calcium phosphate, it will be understood that the same is applicable to other phosphates compounded with a metal base, which in their normal condition are hygroscopic.

Various changes may be made in the steps of the process by those skilled in the art without departing from the spirit of my invention, as claimed.

I claim:

1. A process of making slowly soluble non-hygroscopic phosphate fertilizer comprising mixing crude ground phosphate rock with phosphoric acid in excess, the amount of phosphoric acid being sufficient to convert the phosphate rock to acid calcium phosphate and up to 20 per cent additional phosphoric acid as compared with the amount of acid calcium phosphate formed, fusing the mass by heating the same up to a temperature of 600° C. and grinding the mass.

2. A process of making slowly soluble non-hygroscopic phosphate fertilizer comprising mixing acid calcium phosphate with phosphoric acid up to 20 per cent by weight, heating the mass up to 600° C. until the mass is thoroughly fused and grinding the mass.

3. A fertilizing material comprising acid calcium phosphate fused with phosphoric acid up to 20 per cent by weight, ground to suitable fineness for use in drills.

In testimony whereof I have signed my name to this specification.

HENRY BLUMENBERG, JR.